United States Patent [19]
Carbonell et al.

[11] Patent Number: 5,736,670
[45] Date of Patent: Apr. 7, 1998

[54] FLEXIBLE GAS TIGHT ELECTRICAL CONNECTION FOR GENERATORS

[75] Inventors: Luis Enrique Carbonell, Deltona; Lorenzo Ramirez, Oviedo; Donald Leroy Mills, Deltona, all of Fla.

[73] Assignee: Westinghouse Electric Corporation, Pittsburgh, Pa.

[21] Appl. No.: 314,155

[22] Filed: Sep. 28, 1994

[51] Int. Cl.⁶ .................................................. H01B 7/34
[52] U.S. Cl. ............................................ 174/15.6; 174/19
[58] Field of Search .......................... 174/47, 252, 15.1, 174/17 GF, 15.6, 15.7, 19; 439/190, 191, 194, 196, 331

[56] References Cited

U.S. PATENT DOCUMENTS

| | | | |
|---|---|---|---|
| 3,610,875 | 10/1971 | Dal Molin | 219/130 |
| 3,636,496 | 1/1972 | Jenkins | 339/15 |
| 3,962,530 | 6/1976 | Jones | 174/15 C |
| 4,319,070 | 3/1982 | Imai et al. | 174/15 WF |
| 4,737,120 | 4/1988 | Grabbe et al. | 439/326 |
| 4,963,694 | 10/1990 | Alexion et al. | 174/15.6 |
| 4,986,765 | 1/1991 | Korsunsky et al. | 439/326 |

*Primary Examiner*—Kristine L. Kincaid
*Assistant Examiner*—Marc Machtinger

[57] ABSTRACT

A flexible, gas tight electrical coupling for a gas cooled electrodynamic system such as an electrical generator includes a first connector element that is in communication with a first combined coolant and electrical path and has a first passage defined therein for a coolant, a second connector element that is in communication with a second combined coolant and electrical path and has a second passage defined therein for the coolant, a flexible tube for communicating the first passage in the first connector element with the second passage in the second connector element, and an electrical connection for electrically connecting the first connector element to the second connector element. According to one aspect of the invention, the electrical connection is external to the flexible tube, resulting in cost savings and other advantages when compared to an internal electrical connection. According to a second aspect of the invention, an outside of the flexible tube is sealed to the first and second connector elements to effectively guard against leakage of the coolant.

9 Claims, 3 Drawing Sheets

5,736,670

1

FLEXIBLE GAS TIGHT ELECTRICAL CONNECTION FOR GENERATORS

FIELD OF THE INVENTION

This invention relates generally to the field of large electrodynamic systems, such as electrical power generators. More specifically, this invention relates to an improved connector for a combined electricity/coolant junction in such a system.

DESCRIPTION OF THE PRIOR ART

Certain large electrical power generators of the type that are designed and manufactured by the assignee of this invention, Westinghouse Electric Corporation, include coolant passages in and about the coil windings through which a gaseous coolant is passed during operation to help dissipate heat. In at least one Westinghouse model, conduits that are fabricated out of electrically conductive material are used at certain locations to convey both the gaseous coolant and electricity.

FIG. 1 depicts an electrical connection at the parallel ring/main lead junction for such a generator model. Such connections are designed to be flexible, so as not to transmit vibration between the connected components, and gas tight, so as not to leak during operation.

The conventional parallel ring coupling 10 depicted in FIG. 1 connects a pair of parallel ring connectors 12, 14 both electrically and in terms of coolant communication to a main lead connector 16. Coupling 10 includes machined glass blocks 18, 20 that are formed over bolting hardware and are sealed by means of a silicone compound 22 to the respective connectors 12, 14, 16 and an external rubber insulation cover 24. A number of flexible electrical connectors 26, as shown in FIG. 2, are electrically connected to the connectors 12, 14, 16 respectively by means of bolt 30, as is shown in FIG. 1, to establish the desired electrical connection between the connectors 12, 14, 16. Tape 28 is preferably wound about the connectors 26 to insulate the connectors 26 from the coolant that will pass from connectors 12, 14 through the coupling 10 to the main lead connector 16 during operation.

Although conventional couplings such as that shown in FIGS. 1 and 2 perform well during operation, they are relatively cumbersome and expensive. A need exists in this area of technology for an improved flexible, gas tight electrical coupling that is less expensive and time consuming to manufacture.

SUMMARY OF THE INVENTION

Accordingly, it is an object of the invention to provide an improved flexible, gas tight electrical coupling for a gas cooled electrodynamic system such as an electrical generator that is less cumbersome and expensive to manufacture then conventional couplings are.

In order to achieve the above and other objects of the invention, a flexible, gas tight electrical coupling for a gas cooled electrodynamic system such as an electrical generator includes, according to a first aspect of the invention, a first connector element, the first connector element being in communication with a first combined coolant and electrical path and having a first passage defined therein for a coolant; a second connector element, the second connector element being in communication with a second combined coolant and electrical path and having a second passage defined therein for a coolant; a flexible tube for communicating the first passage in the first connector element with the second

2 passage in the second connector element, the flexible tube having an outside surface; a sealing arrangement for sealing the outside surface of the flexible tube to the first and second connector elements, whereby coolant is prevented from leaking from the connector elements and the flexible tube; and an electrical connection for electrically connecting the first connector element to the second connector element, whereby both coolant and electricity are conducted from the first connector element to the second connector element.

According to a second aspect of the invention, a flexible, gas tight electrical coupling for a gas cooled electrodynamic system such as an electrical generator includes a first connector element, the first connector element being in communication with a first combined coolant and electrical path and having a first passage defined therein for a coolant; a second connector element, the second connector element being in communication with a second combined coolant and electrical path and having a second passage defined therein for a coolant; a flexible tube for communicating the first passage in the first connector element with the second passage in the second connector element, the flexible tube having an outside surface; and an electrical connection for electrically connecting the first connector element to the second connector element, the electrical connection means being external to the flexible tube, whereby both coolant and electricity are conducted from the first connector element to the second connector element.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

DETAILED DESCRIPTION OF THE PREFERRED EMBODIMENT(S)

Figure 3:
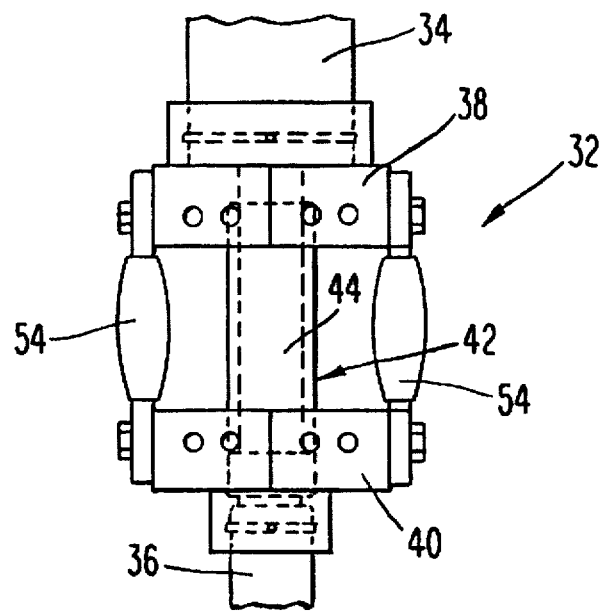
FIG. 3 is a fragmentary view of an electrical coupling that is constructed according to a first embodiment of the invention.
Figure 4:
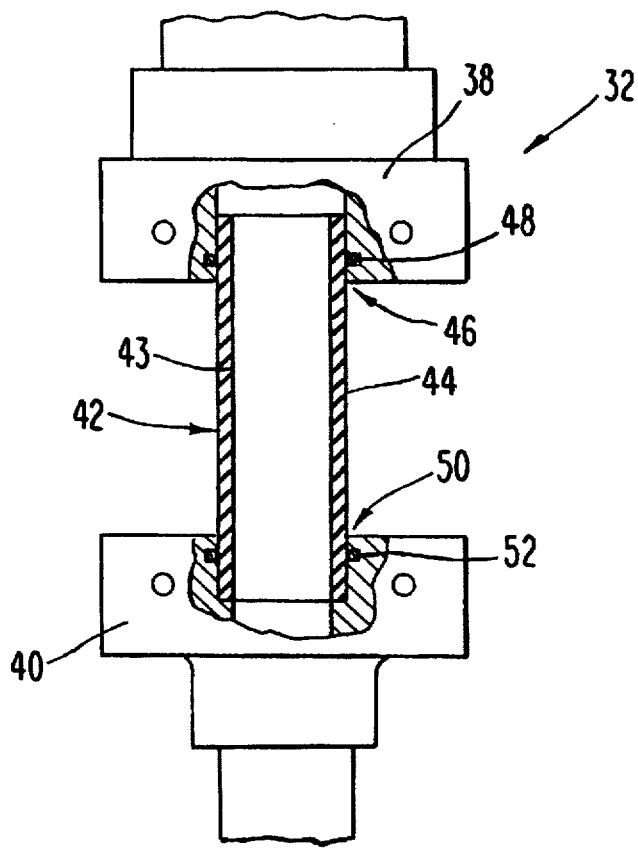
FIG. 4 is a fragmentary cross-sectional view of a portion of the coupling that is depicted in FIG. 3.

Referring again to the drawings, wherein like reference numerals designate corresponding structure throughout the views, and referring in particular to FIGS. 3 and 4, a flexible, gas tight electrical coupling 32 for a gas cooled electrodynamic system such as an electrical generator is intended to provide both a coolant and a electrical connection between a single parallel ring connector 36 and a main lead connector 34. Coupling 32 preferably includes a first connector element 38 that is in communication with a first combined coolant and electrical path, this being the single parallel ring connector 36. Coupling 32 further includes a second connector element 40 that is in communication with a second combined coolant and electrical path, this being the main lead connector 34 depicted in FIG. 3.

As is best shown in FIG. 4, coupling 32 further includes a flexible tube 42 for communicating a first passage in first connector element 38 with a second passage that is defined in second connector element 40 so that coolant may flow during operation, without leakage, between parallel ring 36 and main lead connector 34. Flexible tube 42 has an inside surface 43 for conducting the coolant therealong. Flexible tube 42 includes an outside surface 44, shown in FIG. 4, and is preferably fabricated from a vibration resistent and flexible polymeric material, most preferably polytetraflouroethylene, which is also known by the brand name Teflon®. Alternatively, flexible tube 42 could be fabricated from any other resilient plastic material that is heat-resistant and flexible.

Looking again to FIG. 3, coupling 32 further includes a number of flexible electrical connectors 54, which are each secured to the first and second connectors elements 38, 40, respectively, by a number of connector bolts. Advantageously, electrical connectors 54 are external to flexible tube 42, in order to avoid exposure of connectors 54 to coolant, and reducing the amount of material and sealant that is necessary to achieve the combined coolant and electrical connection with respect to the conventional coupling shown in FIGS. 1 and 2.

Looking again to FIG. 4, it will be seen that first and second sealing arrangements 46, 50, respectively, are provided for sealing the outside surface 44 of the flexible tube 42 with respect to the first and second connector elements 38, 40. In the preferred embodiment, first and second sealing arrangements 46, 50 are embodied as simple O-rings 48, 52. In comparison to the laborious application of the silicone compound that is necessary in conventional couplings such as that depicted in FIGS. 1 and 2, O-rings 48, 52 provide a simple, yet effective seal that prevents leakage of coolant during operation.

Figure 1:
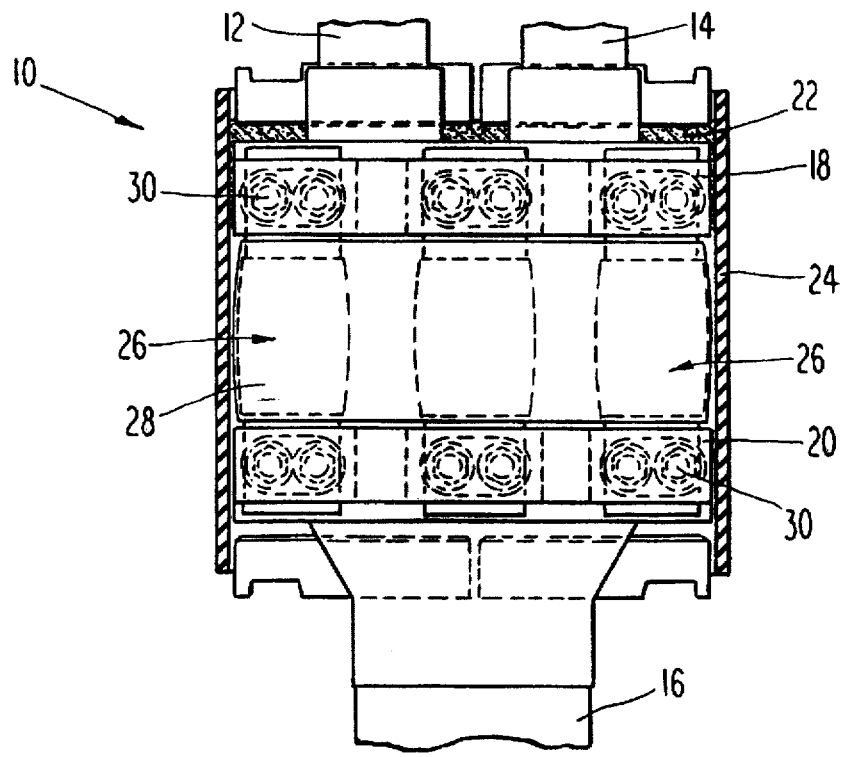
FIG. 1 is a fragmentary cross-sectional view depicting a conventional parallel ring coupling.
Figure 2:
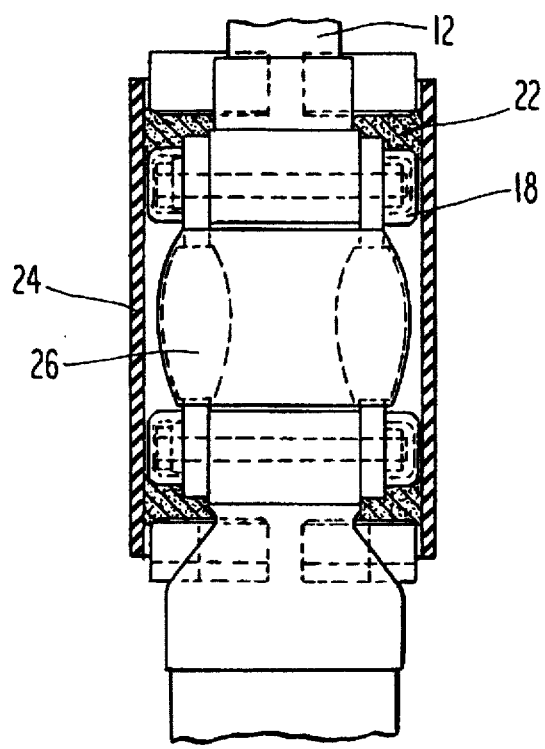
FIG. 2 is a fragmentary cross-sectional view of the coupling depicted in FIG. 1.
Figure 5:
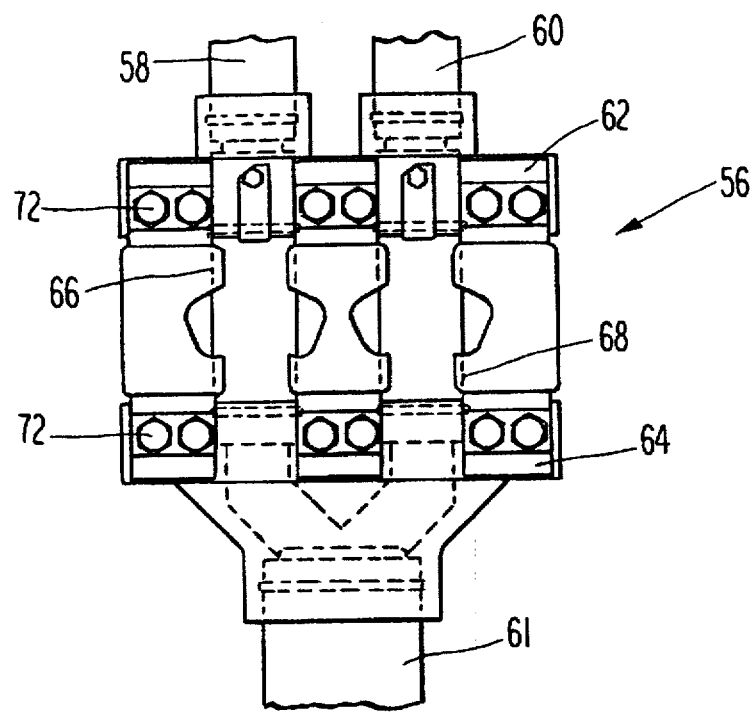
FIG. 5 is a fragmentary view illustrating an electrical coupling that is constructed according to a second embodiment of the invention.
Figure 6:
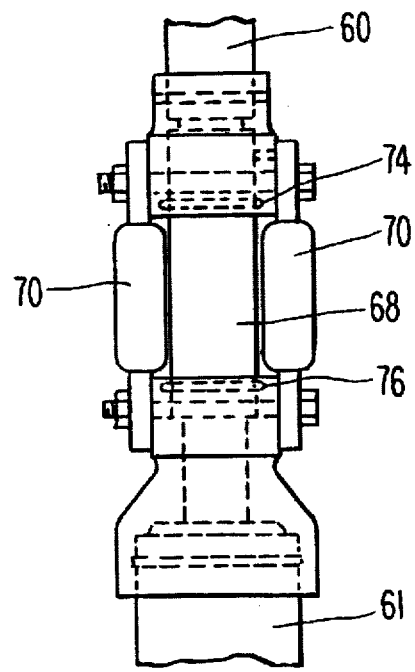
FIG. 6 is a fragmentary view illustrating the electrical coupling that is depicted in FIG. 5.

Referring now to FIGS. 5 and 6, an electrical coupling 56 that is constructed according to a second preferred embodiment of the invention will now be discussed. Coupling 56 is designed to provide communication between a pair of parallel ring connectors 58, 60 to a single main lead connector, in the same manner as the conventional coupling that is depicted in FIGS. 1 and 2. Coupling 56 includes first and second connector elements 62, 64 and first and second flexible tubes 66, 68. First flexible tube 66 is provided to communicate coolant from parallel ring connector 58 to main lead connector 61 via passages in the first and second connector elements 62, 64. Second flexible tube 68 is provided to communicate coolant between parallel ring connector 60 and main lead connector 61 via passages and connector elements 62, 64. As in the first described embodiment, the second embodiment of the invention includes a number of flexible electrical connectors 70 that are provided to electrically communicate the first connector element 62 with the second connector element 64. Bolts 72 are used to secure the electrical connectors 70 to the respective connector elements 62, 64. As in the first described embodiment, sealing arrangements that are embodied as O-rings 74, 76 are provided to seal outer surfaces of flexible tubes 66, 68 to the first and second connector elements 62, 64. Again, as in the above described embodiment, electrical connectors 70 are external to the flexible tubes 66, 68.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

We claim:

1. A flexible, gas tight electrical coupling for a gas cooled electrodynamic system comprising:

a first connector element, said first connector element being in communication with a first combined coolant and electrical path and having a first passage defined therein for a coolant;

a second connector element, said second connector element being in communication with a second combined coolant and electrical path and having a second passage defined therein for a coolant;

a flexible tube for communicating said first passage in said first connector element with said second passage in said second connector element, said flexible tube having an inside surface for conducting a fluid therealong and having an outside surface;

sealing means for sealing substantially the entire outside surface of said flexible tube to said first and second connector elements, whereby coolant is prevented from leaking from said connector elements and from said flexible tube; and electrical connection means disposed externally to said flexible tube for electrically connecting said first connector element to said second connector element.

2. A coupling according to claim 1, wherein said flexible tube is fabricated from a polymeric material.

3. A coupling according to claim 2, wherein said flexible tube is fabricated from polytetraflauoroethylene.

4. A coupling according to claim 1, wherein said flexible tube is fabricated from a vibration-resistant material.

5. A coupling according to claim 1, wherein said sealing means comprises a first O-ring for sealing said outside surface of said flexible tube to said first connector element, and a second O-ring for sealing said outside surface of said flexible tube to said second connector element.

6. A flexible, gas tight electrical coupling for a gas cooled electrodynamic system comprising:

a first connector element, said first connector element being in communication with a first combined coolant and electrical path and having a first passage defined therein for a coolant;

a second connector element, said second connector element being in communication with a second combined coolant and electrical path and having a second passage defined therein for a coolant;

a flexible tube for communicating said first passage in said first connector element with said second passage in said second connector element, said flexible tube having an inside surface for conducting a fluid therealong and having an outside surface; and electrical connection means for electrically connecting said first connector element to said second connector element, said electrical connecting means being external to said flexible tube.

7. A coupling according to claim 6, wherein said flexible tube is fabricated from a polymeric material.

8. A coupling according to claim 7, wherein said flexible tube is fabricated from polytetrafluoroethylene.

9. A coupling according to claim 6, wherein said flexible tube is fabricated from a vibration-resistant material.

* * * * *